Sept. 23, 1969     C. A. NOLL ET AL     3,468,796
CHEMICAL FEED METHODS AND APPARATUS
Filed Oct. 13, 1967
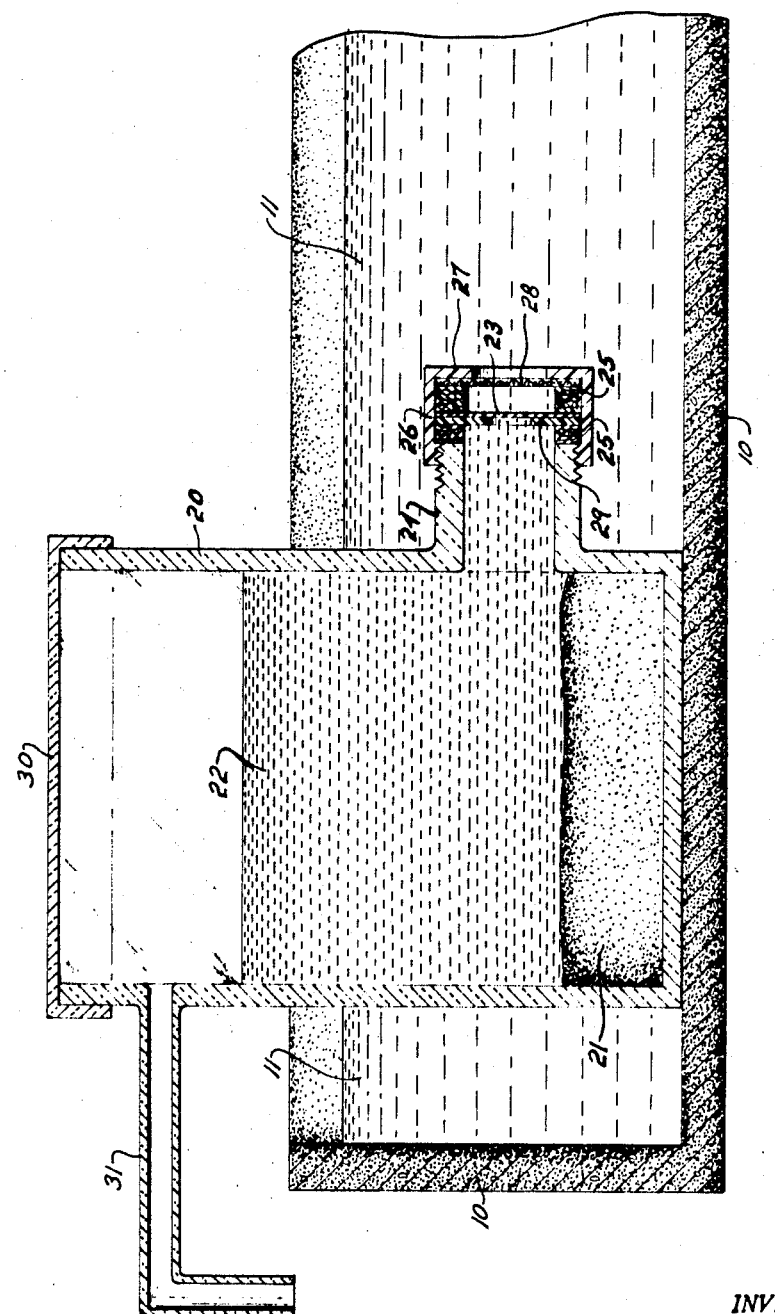
INVENTOR.
CHARLES A. NOLL
LUCIANO J. LA SALVIA
BY
William J. Holcomb.
ATTORNEY United States Patent Office 3,468,796
Patented Sept. 23, 1969

3,468,796
CHEMICAL FEED METHODS AND APPARATUS
Charles A. Noll and Luciano J. La Salvia, Philadelphia, Pa., assignors to Betz Laboratories, Inc., Trevose, Pa., a corporation of Pennsylvania
Filed Oct. 13, 1967, Ser. No. 675,224
Int. Cl. B01d 13/00
U.S. Cl. 210—22
14 Claims

ABSTRACT OF THE DISCLOSURE

Methods and apparatus for dispensing chemicals to liquid media at a relatively uniform and constant rate. Such dispensing or feeding is by means of the diffusion of the chemicals from a solution, through a membrane permeable in respect to the chemical, and into the liquid to be treated.

BACKGROUND OF THE INVENTION

Countless applications involve the addition of chemicals to liquids at a relatively uniform and constant rate. To date, such applications have involved either the tedious and laborious manual addition of such chemicals with appropriate weighing and measurement, the use of precision feeding and metering equipment such as pumps, or the control of solubility by physical means or timed release. The drawbacks of manually measuring, adding and controlling the chemical addition are obvious in terms of laboriousness, and attended by human error. The use of precision feeding and metering equipment is accompanied by numerous impediments including expense. Such systems involve many moving parts with the consequent necessity for maintenance, repair and replacement. In addition, they are highly susceptible to stoppages. The third existing approach to the uniform feed of chemicals to liquids involves the imposition of solubility controls. For example, the chemical is prepared in the form of a pellet or briquette which dissolves at a controlled rate. However, such an approach is also fraught with problems. In the first instance, the extent of the surface area of such pellets changes as the structure is dissolved, with consequent changes in the quantity of chemical released. In addition, such pellets commonly develop surface coatings which impair the desired dissolution of the chemical.

The importance of the uniformity and continuity of the feed rate of such chemicals is relatively proportionate to the criticality of the presence of chemical in the liquid to which it is added. Such criticality is typified by, but not restricted to, the application of corrosion inhibitors, anti-scaling agents, biocides, pH control agents, etc., in the water treatment industry. For example, corrosion inhibitors must be maintained at constant levels in cooling water and boiler water systems. While the consequences of inconsistant inhibitor levels in cooling systems primarily involves the loss of expensive equipment such as heat exchange units, corrosion in boiler systems may result in explosions and fatalities. Such systems are frequently sensitive to even brief interruptions of the chemical feed. When the corrosion prevention mechanism is dependent upon protective films, a halt in the feed of the film forming chemical permits the initiation of corrosion which may not be stemmed by the subsequent resumption of the feeding of the film forming chemical. Similarly, fluctuations in the feed of anti-scaling agents to boiler and cooling systems may result in the formation of scale which cannot be removed subsequently by chemical means. Such scale formation impairs efficiency in the case of heat exchange processes and reduces capacity in all processes. Industrial biocides employed in paper mill and cooling water systems are also frequently dependent upon the uninterrupted feed of the biocidally active chemical. In such applications, micro-biological growths which flourish during interruptions in the feed of the biocide may tenaciously resist subsequent removal and form slime deposits which must be physically removed. These water treatment applications, and their criticality, are amply discussed by U.S. 2,711,391 and 2,900,222 in the case of cooling water treatments, by U.S. 2,307,466, 2,460,259 and 3,188,289 in respect to boiler water, by 3,231,509 in the case of slime control agents for cooling and paper mill water, and generally by the "Betz Handbook of Industrial Water Conditioning" (6th Edition, 1962, published by Betz Laboratories, Inc., Philadelphia, Pa.).

Such critical chemical feed applications are not restricted to the water treatment industry nor to aqueous media. For example, anti-foulants employed in petroleum refining are also critical in respect to the uniformity of feed as indicated by U.S. Patents 3,271,295 and 3,271,296.

Furthermore, the difficulty of feeding chemicals is compounded when small quantities of chemicals are involved. In such cases, the problems of precise metering and dispensing are compounded and the methods are rendered appreciably more expensive. For example, in the water treatment applications previously discussed, the chemicals employed are conventionally added to the liquids treated at levels in the range of 0.1 to 100 parts by weight for each one million parts by weight of the liquid which is thus treated to yield concentrations of between 0.0000001 to 0.0001%. As a consequence, the treatment of 1,000,000 pounds of water may involve the gradual and uniform feeding of as little as one-tenth of a pound of the chemical employed during appreciable periods. Obviously, the feeding and metering equipment capable of such performance is intrinsically expensive since, despite the small amount involved, the concentration of the chemical maintained within the liquid treated must be uniform and constant. Simultaneously, even minor interruptions of the feed system may drastically impair such uniformity.

It is an object of the invention to provide methods and apparatus for feeding chemicals to liquids at a uniform and constant rate.

A further object is the provision of methods and apparatus for feeding chemicals to liquids at a uniform and constant rate by means independent of equipment employing moving parts.

Another object of the invention is the provision of methods and apparatus for feeding chemicals to liquids at a uniform and constant rate by means independent of metering equipment or devices.

An additional object of the invention is the provision of methods and apparatus for feeding chemicals to liquids at a uniform and constant rate by means which avoid the necessity for frequent maintenance, inspection, repair or the replenishing of the chemical feed supply.

Yet another object of the invention is the provision of methods and apparatus for feeding chemicals to liquids at a uniform and constant rate in which the chemical is added to the liquid in a form optimal for dispersion within the liquid.

Still another object of the invention is the provision of methods and apparatus for feeding chemicals to liquids at a uniform and constant rate by means which are relatively devoid of stoppages, interruptions or mechanical failures.

These and other objects of the invention will become apparent upon an examination of the specification, claims and the attached drawing.

The foregoing objects are achieved by diffusing the chemical to be fed, through a membrane which is permeable in respect to the chemical. More precisely, the chemical is diffused from a concentrated solution to a less concentrated solution in the form of the liquid to be treated. As a consequence of the fact that such diffusion is dependent upon passage from a more concentrated to a less concentrated solution, the feed solution of the chemical must contain a concentration of the chemcal which is higher than the concentration of the chemical which is desired in the liquid to be treated. For example, a 10% feed solution of a chemical cannot be employed to achieve a level of 15% of the chemical in the liquid to be treated.

GENERAL DESCRIPTION OF THE INVENTION AND THE DRAWING

The actual practice of the invention can best be understood in conjunction with the preferred embodiment which is depicted by the drawing. The sole figure of the drawing comprises a cross-sectional view through inventive apparatus positioned within the sump 10 of a cooling tower (not illustrated) which receives the cooling water 11 falling from the cooling tower. Such cooling water 11 normally possesses a temperature in the range of 60 to 100° F. as the result of the air cooling which is experienced in the passage of the water through the cooling tower. The apparatus shown comprises a feeder 20, preferably formed of a transparent material which permits the observation of its contents. In a preferred practice of the invention, the chemical 21 to be employed in the treatment of the cooling water 11 is placed within the feeder 20 and admixed with a suitable solvent to form a feed solution 22 of the chemical 21. The solvent selected is preferably the same as or similar to the liquid treated, e.g. the cooling water 11 in the case of the system illustrated by the drawing, or the solvent embodied in the liquid to be treated when the liquid is a solution. In addition, the feed solution 22 preferably comprises a saturated solution. Saturated solutions are preferred because of the fact that less frequent additions of the chemical to the feeder 20 are then required, and because a uniform feed solution is constantly maintained. Specifically, when a saturated solution is employed, the undissolved chemical 21 serves to constantly replenish the feed solution 22 as the chemical 21 dissolved in the feed solution 22 is diffused into the cooling water 11. As a consequence of the fact that undissolved chemical 21 is present within the feeder 20 and constantly replaces the quantity of the chemical 21 which is diffused from the feed solution 22, the concentration of the dissolved chemical 21 contained by the feed solution 22 remains relatively constant. Obviously, the concentration of the chemical 21 contained by the feed solution 22 may be influenced by extraneous factors such as pH and temperature. However, in all cases, the pH may be controlled by excluding materials which influence pH from the interior of the feeder 20, and in the case of the treatment of cooling water, the temperature of the feeder remains substantially constant due to the intrinsic nature of the process, i.e. the constant introduction of water at an elevated temperature and the mass of water involved negates the effect of climatic temperature conditions for all practical purposes. However, in those cases in which the feeder 20 is directly exposed to varying temperatures, an auxiliary immersion heater and thermostatic control (not illustrated) may be employed in the feeder 20. Similarly, the concentration of the feed solution 22 may be maintained substantially uniform and constant by incorporating a simple agitator (not illustrated) in the feeder 20.

The feeder 20 is also provided with a semi-permeable membrane 23 which separates the feed solution 22 from the cooling water 11 and forms a semi-permeable interfacial barrier therebetween. In the feeder 20 illustrated by the drawing, the feeder 20 is provided with a cylindrical, threaded projection 24 which permits the simple removal or replacement of the membrane 23. The circular membrane 23 possesses a diameter which is slightly greater than the inner diameter of the projection 24 and is positioned between two semi-resilient annular gaskets 25 which possess an outer diameter approximating that of the membrane 23 and an inner diameter approximating that of the projection 24. The membrane 23—gasket 25 assembly is positioned and retained upon the outlet end of the projection 24 by an annular threaded retainer 26 having an inner diameter approximating the outer diameter of the membrane 23, projection 24 and gaskets 25, encompasses the membrane 23 and gaskets 25 within its bore, and engages the threads of the projection 24. The tightening of the retainer 26 serves to compress the gaskets 25 between the vertical lip 27 of the retainer 26 and the vertical edge of the projection 24 which is parallel to the lip 27, compresses the membrane 23 between the opposed surfaces of the gaskets 25, and consequently yields a liquid-tight seal. Since the vertical lip 27 of the retainer 26 does not span the orifice of the projection 24, the cooling water 11 is permitted to contact one major surface of the membrane 23 while the parallel major surface of the membrane 23 is contacted by the feed solution 22. Given such an arrangement, and provided that the membrane 23 is permeable in respect to the chemical 21, the chemical 21 dissolved in the feed solution 22 will diffuse through the membrane 23 by means of dialysis for so long as the concentration of the chemical 21 in the feed solution 22 exceeds the concentration of the chemical 21 in the cooling water 11.

Certain non-essential but desirable refinements of the invention are also illustrated by the drawing. For example, the membrane 23 may be protected against fracture or penetration by means of a protective shield 28 which is depicted as a circular ply of woven wire screening having an outer diameter approximating the inner diameter of the retainer 26. The shield 28 as shown is compressedly retained between the vertical lip 27 of the retainer 24 and the gasket 25 next adjacent to the vertical lip 27, and will protect the membrane 23 against the instrusion of objects larger than the foramina of the screening which is employed in the fabrication of the shield 28. Alternatively, a similar protective device may be employed in place of, or in conjunction with the shield 28. Specifically, many of the materials commonly employed as semi-permeable membranes have a tendency to age and lose their strength or structural integrity. In such case, when the feeder 20 is lifted from the cooling water 11 the membrane 23 is subjected to the internal pressure of the feed solution 22 without the equalizing pressure of the cooling water 11 on its opposite surface, and the age deteriorated membrane 23 may then rupture. In order to prevent such occurrences and thereby prolong the useful life of the membrane 23, the protective shield 28, or a second similar shield, may be placed in direct contact with the membrane 23. In such case, the entire span of the membrane 23 is not subjected to the internal pressure of the feed solution 22 when the feeder 20 is removed from the cooling water 11. Instead, only segments of the membrane 23 corresponding in size to the foramina in the shield 28 are subjected to the pressure and the possibility of rupture is greatly reduced. Alternatively, the adverse effects of internal water pressure upon the membrane during the removal of the feeder from the water may be counteracted by capping the orifice in the retainer 26 prior to removing the feeder from the water.

Another refinement illustrated by the drawing, comprises the annular orifice reducer 29 which is shown in contact with the inner surface of the membrane 23 but which may also be utilized on the opposite surface of the membrane 23, i.e. in contact with that surface of the membrane 23 which is in direct contact with the cooling water 11. The reducer 29 is employed to control the extent of the surface of the membrane 23 which is available for the diffusion of the chemical 21 dissolved in the feed solution 22. As will be subsequently discussed in detail, the quantity of the chemical 21 which is diffused through the membrane 23 and into the cooling water 11 is in part a function of the surface area of the membrane 23 which is effective, i.e. available for diffusion. When an obstruction such as the reducer 29 is placed in contact with either or both of the surfaces of the membrane 23, that portion of the membrane 23 which is contacted by the reducer 29 ceases to provide a diffusion function. As a consequence, diffusion occurs only through the nonoccluded portion of the membrane 23. By means of the utilization of reducers 29 having different sizes, a standard size membrane 23 and projection 24 may be employed and the diffusion rate may be controlled by means of reducers which leave varying quantities of the surface area of the membrane 23 available for diffusion. While the drawing shows an annular reducer 29 having a circular central bore having a diameter which determines the extent of the surface area of the membrane 23 available for diffusion, various alternative approaches may be employed. For example, circular foraminous or perforate reducers may be employed. In such case, the diameter of the foramina, and the number of such foramina, determine the extent of the surface area of the membrane 23 which is available for diffusion. When the latter type of reducer is employed, it serves the dual function controlling the diffusion rate and protecting the membrane 23 against rupture and punctures.

In the drawing, the feeder 20 is provided with a slip-fit or friction-fit cover 30 which permits ready access to the interior of the feeder 20 for such purposes as the addition of further quantities of the chemical 21. When the feed solution 22 is employed in the preferred form, i.e. as a saturated solution, additional quantities of the chemical 21 may be merely added to the feed solution 22 with slight agitation. Such quantities may be added until an undissolved excess of the chemical 21 is achieve within the feeder 20, as shown by the drawing. When such a condition is achieved, the quantities of dissolved chemical contained by the feed solution 22 which are transmitted to the cooling water 11 by diffusion, will be automatically replaced by the dissolution of the undissolved chemical 21 which exists at the bottom of the feeder 20. Consequently, the concentration of the feed solution remains uniform and constant.

The drawing depicts a further refinement in the form of the tube 31 which projects from the vertical wall of the feeder 20 at a point above the liquid levels of the feed solution 22 and the cooling water 11. Such a tube 31 may provide alternate functions. In the first instance, the tube 31 may serve to bleed off excesses of the feed solution 22 which may be created by osmosis. Specifically, the diffusion of the chemical from the feed solution 22, through the membrane 23, and into the cooling water 11, is normally accompanied by a counter flow or translocation of the solvent phase of the diffusate or liquid being treated, i.e. water in the case of the cooling water 11 shown in the drawing. As a consequence of such osmosis, the quantity of the feed solution 22 is increased and the level of the solution rises within the feeder 20. When the feed solution 22 reaches the elevation of the tube 31, it is permitted to overflow through the tube 31. In the arrangement illustrated by the drawing, such overflow will pass outside of the sump 10 and will not be deposited within the cooling water 11 due to the projection of the tube 31 beyond the wall of the sump 10. However, in many instances the overflow from the tube 31 may safely be introduced to the cooling water 11. Specifically, the concentration of the feed solution 22 rapidly diminishes as its elevation above the undissolved chemical 21 present in the bottom of the feeder 20 is increased. Accordingly, it is preferable to position the projection 24 in the vertical wall of the feeder 20 at an elevation at which the maximum concentration of the feed solution 22 exists. The zone of maximum concentration of the feed solution 22 is immediately adjacent to the undissolved quantity of the chemical 21 which exists in the bottom of the feeder 20. Accordingly, the portion of the feeder 20 below that point at which the projection 24 is joined to the vertical wall of the feeder 20 may be considered as a reservoir for the undissolved portion of the chemical 21 and the upper horizontal surface of the undissolved chemical should be maintained at an elevation approximating the elevation of the lowest point of the inner diameter of the projection 24 if an extremely accurate diffusion rate is desired. In any event, since the concentration of the chemical 21 contained by the upper strata of the feed solution is low, any overflow from these upper strata will also contain small quantities of the chemical and the introduction of the overflow to the cooling water 11 will not appreciably affect the quantity or level of concentration of the chemical which is present in the cooling water 11.

It should also be noted that the osmotic translocation of the solvent or water from the exterior of the feeder 20 to the feed solution 22, does not appreciably affect the conecentration of that portion of the feed solution employed in diffusing the chemical to the liquid to be treated, when a saturated solution of the chemical is utilized as the feed solution 22. Specifically, quantities of the solvent or cooling water 11 which pass through the membrane 23 and into the interior of the feeder 20 by means of osmosis, serve to dissolve further portions of the undissolved chemical 21 present in the bottom of the feeder 20 and consequently yield a concentration equal to the maximum concentration which may be realized at the extant temperature in terms of the solubility of the chemical 21 in the cooling water 11 at that temperature.

The tube 31 shown in the drawing may also serve an alternate function. Specifically, it may serve as a means of constantly or periodically replenishing the supply of the feed solution 22 which is contained by the feeder 20, particularly when the preferred approach of employing a saturated solution of the feed solution 22 is not pursued. In such case, the desired feed solution 22 may be fed to the feeder 20 on either a continuous or sporadic basis.

While the foregoing description in relation to the drawing provides a general explanation of the operation of the inventive methods and apparatus, and subsequent descriptions in respect to specific applications will be provided, the method of developing a suitable feed method in respect to a given system to be treated should be discussed. In designing such a method, the demands of the system to be treated, and the conditions surrounding that system, must first be considered. For example, assume that the treatment of a cooling water system with a chromate corrosion inhibitor is desired, and that a treatment level of 50 parts per million of chromate as $CrO_4$ is to be maintained. Such corrosion inhibition treatments are disclosed by U.S. 2,711,391 and 2,900,222. It is further determined that the temperature of the cooling water to be treated, and consequently the temperature to which the feeder 20 and the feed solution 22 will be subjected is 70° F. It is found that sodium dichromate, a chemical which is generally suitable for the formation of a chromate containing feed solution, has a solubility such as to yield a 65% solution at 70° F. Consequently, a saturated feed solution may be obtained by mearly maintaining an excess of sodium dichromate and the resulting solution will contain 53% by weight of chromte as $CrO_4$. It should be noted that since the desired treatment level is 50 ppm, the treated cooling water will comprise a 0.00005% solution of chromate as $CrO_4$, and accordingly the feed solution, which constantly comprises a 65% solution of sodium dichromate will continuously constitute the more concentrated solution and diffusion of the chromate from the more concentrated to the less concentrated solution will proceed indefinitely, i.e. from the feed solution to the cooling water, since equilibrium may not be reached at the desired treating level.

The next factor to be established is the feeding rate which must be provided by the feeder. Again, this factor is dependent upon the particular characteristics of the system to be treated. For example, recirculating cooling water systems are commonly subjected to two sources of water loss from the system, and correspondingly to the addition of make-up water which compensates for these losses and maintains the desired quantity of the water in the system. The nature and extent of blowdown and windage or evaporation are amply disclosed by pages 252 to 254 of the 'Betz Handbook of Industrial Water Conditioning" (ibid). If it is determined that the system to be treated has a continuous, combined blowdown and evaporation loss of 1% and a capacity of 10,000 gallons, the rate of the feeder may be readily determined. Specifically, at the desired treatment level of 50 p.p.m., the 10,000 gallons (83,310 pounds) of water contain 4.165 pounds of chromate as $CrO_4$. In addition, the system experiences a 1% blowdown and windage loss with the result that 0.04165 pounds or approximately 18.9 grams of chromate as $CrO_4$ are lost each hour. Consequently, the feeder employed must be capable of supplying 18.9 grams of chromate as $CrO_4$ to the system during each hour. In this regard, it should be noted that this same calculation reveals the quantity of chromate which must be initially applied to the system in order to achieve the desired chromate level which is to be maintained by the feeder. In the system described, 4.165 pounds of chromate as $CrO_4$ may be added to the system in a single addition to yield the 50 p.p.m. initial chromate level, and an inventive feeder capable of diffusing 18.9 grams of $CrO_4$ per hour may then be placed in the system for the purpose of maintaining that level. It should be noted that the 4.165 pounds of chromate as $CrO_4$ which is initially added may be added in the form of approximately 5 pounds of sodium dichromate ($Na_2Cr_2O_7$) which contain 4.165 pounds of chromate as $CrO_4$. At the stated temperature of the system, sodium dichromate is rapidly converted to sodium chromate which is highly soluble in the water and immediately disseminated therein.

The next step in the design of the desired feed system involves the selection of an appropriate membrane. The membrane selected must permit the passage of the chemical to be fed at the desired rate, e.g. 18.9 grams of chromate per hour in the above described cooling system. The passage of the chemical through the membrane is primarily a "go" "no-go" proposition which is dependent upon the pore size of the membrane, while the rate which is realized when a membrane having an adequate pore size is found, is dependent upon both the porosity of the membrane and the surface area of the membrane which is available for diffusion. All of the foregoing factors may be best determined by means of actual testing. For example, feed solutions of the desired concentration may be placed in a feeder such as that shown by the drawing, in which the exposed or effective portion of the circular membrane 23 is of a known diameter. Membranes of increasing pore size may be tried until actual diffusion occurs. Once diffusion is realized, the rate of diffusion may be established by placing the feeder 20 in a known quantity of water for a measured period of time with the membrane 23 immersed in the water, and subsequently measuring the quantity of the chemical which has diffused into the water in which the feeder 20 is immersed. This quantity, in terms of the area of the membrane and the length of the diffusion period, yield a diffusion rating for that particular membrane in relation to the specific chemical employed, e.g. weight quantity of chemical diffused, per square area unit of the membrane, per unit of time. Such a determination is described by Example 1.

EXAMPLE 1

A saturated solution of anhydrous sodium dichromate was prepared in water at 70° F. and was found to contain 180 grams of sodium dichromate per 100 milliliters of water. Accordingly, the solution contained approximately 64.3% by weight of sodium dichromate and approximately 53% by weight of chromate as $CrO_4$. The solution was placed in a feeder similar to that shown by the drawing and having a projection 24 with an inner diameter of 3 inches, and a membrane 23 with an effective diameter of 3 inches. Accordingly, the effective area of the membrane which was available for diffusion was 7 square inches. Various membranes were tested with this solution and feeder, and it was visibly perceptible, i.e. due to the orange tint, that chromate was diffused through the membrane when a membrane having a pore size of 48 angstrom units and a thickness of 0.0020 inches was employed. The feeder containing the previously described solution was then placed in 10 liters of tap water maintained at 70° F. with the entire membrane fully immersed in the tap water. At the end of each hour following immersion samples of the tap water were taken and analyzed for $CrO_4$ by means of the analytical technique described by pages 356 to 358 of the "Betz Handbook of Industrial Water Conditioning" (ibid). Such analysis revealed that the concentration of $CrO_4$ contained by the tap water was continuously increased at the rate of approximately 4.6 grams per hour. Accordingly, it was apparent that the particularly membrane selected diffused chromate as $CrO_4$ at a rate of 0.657 grams/square inch of membrane/hour under the conditions noted, i.e. when in contact with water at a temperature of 70° F.

The application of the diffusion data obtained in Example 1, to a cooling water system such as that previously described, is demonstrated by Example 2.

EXAMPLE 2

A chromate corrosion inhibition treatment level of 50 p.p.m. (as $CrO_4$) was prescribed for a recirculating cooling system containing 10,000 gallons of water and experiencing a 1% water loss due to continuous blowdown and evaporation (windage). The temperature of the cooling water contained by the cooling water sump averaged 70° F. A feeder similar to that illustrated by the drawing and having a capacity of 30 gallons, was employed in combination with the membrane of Example 2 with the surface area of the membrane available for diffusion maintained at 29.9 square inches by means of an annular reducer having a central bore with an inner diameter of 6.18 inches. Accordingly, the membrane was capable of diffusing 18.9 grams per hour of chromate as $CrO_4$ at 70° F. since the membrane employed possessed a chromate diffusion capacity of 0.657 gram/square inch/hour. Prior to the immersion of the feeder in the cooling water sump, 5 pounds of sodium dichromate were added to the cooling water in order to obtain a chromate level of 50 p.p.m. in the cooling water. The feeder was then placed in the sump, 12 pounds (5,444 grams) of sodium dichromate were placed in the bottom of the feeder, and one liter of the cooling water was added to the sodium dichromate in the feeder with stirring. Accordingly, the water added to the feeder formed a feed solution containing 64.3% or 1800 grams of sodium dichromate and 53% or 1483 grams of chromate as $CrO_4$. The undissolved sodium dichromate which remained in the bottom of the feeder and imparted the saturated nature of the solution comprised 3,961 grams and was subsequently dissolved to replace the chromate diffused through the membrane and into the cooling water. The initial feed solution formed at the outset provided a 3¼ day supply of chromate at the desired treatment level and diffusion rating of the membrane. In addition, the undissolved sodium dichromate was gradually and continuously dissolved by water entering the feeder through the membrane as the result of osmosis to provide an additional 7 day supply of the feed solution. Consequently, the feeder as originally charged was capable of forming the desired feed solution and of diffusing the desired level of chromate into the cooling water for a period of over 10 days, without further need for inspection, maintenance or the recharging of the feeder with additional chemical. Periodic analysis of the cooling water contained by the treated system at a variety of sampling points revealed that the desired treatment level of 50 p.p.m. of chromate as $CrO_4$ was uniformly and constantly maintained.

It should be noted that a variety of semi-permeable membranes are available and suitable for the practice of the invention. While regenerated cellulose is perhaps the most readily available membrane media, and available in a variety of forms, e.g. supported with glass fibers, sizes, e.g. thicknesses ranging from as little as 0.001 inches, and diversity of pore sizes and permeability ratings, other semi-permeable membrane media are also suitable. For example, Paterson parchment paper, denitrated cellulose and cellulose acetate are also suitable. The pore diameters of these materials commonly range between 20 to 60 angstrom units and they are available in a variety of V' values (relative volume occupied by pores) e.g. 0.2–0.6, and tortuosity values (ratio of capillary length to wet thickness) e.g. 2–5. As previously indicated, the membrane suitable for the specific chemical to be employed, at the treatment level desired, may best be determined by means of actual diffusion tests such as that described by Example 1.

It should also be noted that the inventive methods and apparatus may be employed for the simultaneous diffusion of a number of chemicals. For example, a 90:5:5 weight ratio of sodium dichromate, zinc chloride and sodium tripolyphosphate was blended and dissolved in a feeder similar to that illustrated by the drawing. When the feeder was immersed in the water, the water exhibited upon analysis a 90:5:5 ratio of diffused chromate, zinc and phosphate. Obviously, when such chemical blends are employed, the pore size of the membrane utilized must be adequate to permit the passage of the largest molecules contained by the blend and all of the chemicals must be soluble in the common solvent which is employed.

Alternatively, a feeder compartmented to segregate the feeder contents, with each compartment provided with its own diffusion membrane, may also be employed to simultaneously diffuse a variety of chemicals. In such case, the surface areas of the individual membranes may be manipulated to provide varying diffusion rates for the different chemicals.

Furthermore, a plurality of diffusion membranes may be employed in conjunction with a single feeder. Such an approach is advisable when the desired treatment level and the diffusion rating of the membrane selected, dictate an extensive membrane surface area. As previously indicated, the membrane may be integrally supported by reinforcements such as glass fibers, or externally supported by grids and the like which are emplaced in a supporting contact with the membrane. However, many of the membranes are inherently of a relatively fragile nature and the greater the area of the membrane, the greater the chance of rupture or penetration by foreign objects. Accordingly, it may be advisable to employ plural membranes when extensive membrane surface area is necessary. For example, when a diffusion area of 38 square inches is required, two circular membranes having a diameter of 5 inches each may be employed in place of a single membrane having a diameter of 7 inches. Such an embodiment may be readily visualized in conjunction with the drawing. Specifically, a second projection 24 may be provided in the feeder 20 at a point directly opposite the first projection 24. While the second projection 24 may be placed at any point about the circumference of the feeder 20, it is preferable that it be located at an elevation above the bottom of the feeder 20 which corresponds to that of the first projection 24. As previously indicated, the concentration of the portion of the feed solution 22 decreases as its elevation above the undissolved chemical 21 increases and the plural projections 24 should share the same zone of the feed solution 22 for uniform diffusion.

Obviously, the membrane need not be placed in a projection such as that depicted by the drawing. Instead, the membrane may be placed in a cut-out portion of the feeder wall and suitably gasketed or sealed by a variety of means. In other applications, a feeder which is substantially a diffusion membrane may be employed. Specifically, the feed solution may be placed in a bag formed from a semi-permeable membrane and the bag may then be placed in the liquid to be treated. In such case, the membrane may be protected and/or supported by structural members adhered or attached to the surface of the permeable bag or the bag may be positioned within a perforate cylindrical structure in a relationship in which the bag is supported through contact with the perforate cylinder walls or merely suspended within the bore of the cylinder without contacting the cylinder walls.

It should also be noted that the turbulence of the fluid environment in which the feeder is placed may have some slight affect upon the diffusion rate. If such should prove to be true, the inventive methods and apparatus may be simply modified to compensate. For example, in relation to the drawing, the feeder 20 depicted could be revolved horizontally upon its base through 180°. In such case, the membrane 23 would be in close proximity to the vertical wall of the sump 20 and thus isolated from the direct effects of turbulence in the cooling water 11. Alternatively, a louvered structure may be substituted for the protective shield 28. In such case, the louvers protect the membrane 23 from the effects of turbulence as well as shielding it against fracture or penetration without impairing diffusion.

It must also be realized that the chemicals employed in the inventive feeders need not be powders such as the previously described sodium dichromate. Instead, the chemicals may comprise liquids or briquetted powders. Similarly, aqueous systems are not the only materials susceptible to the practice of the invention. For example, solutions of cobalt chloride in isopropanol have been successfully diffused into both isopropanol and water. The achievement of the diffusion and solution in this case was particularly evident. Specifically, the cobalt chloride provided a characteristic blue solution in the alcohol feed solution but the pink tint which is characteristic of aqueous solutions appeared upon the diffusion of the cobalt chloride into the water. Similarly, solutions of iodine in hydrocarbon solvents such as trichloroethylene have been diffused by the inventive technique into water. As indicated in the case of the diffusion of a chemical from an alcohol solution into water, the solvents employed in the feed solution and in the diffusate may be different. In addition, the use of such diverse solvent systems may be employed to create controlled fluctuations in the diffusion rate. For example, mercuric chloride has a solubility of approximately 7 parts in 100 parts of water at 25° C., whereas its solubility at that temperature is 33 parts in 99% ethyl alcohol. Consequently, if it is desired to feed the chemical to water at a higher initial rate, and gradually reduce the rate to a uniform level, the initial feed solution may be prepared with 99% ethyl alcohol. The more concentrated alcohol solution will diffuse more rapidly until such time as water enters the feeder by osmosis and forms a less concentrated aqueous solution. Other means may also be employed to control the diffusion rate since dialysis or diffusion may be affected either directly or indirectly by pH, temperature or the hydration of the solute molecules. For example, the solubility of many chemicals is changed in the presence of alkaline or acidic conditions and such conditions may be artificially imposed upon the environment of the feeder, i.e., by means of slow release acid or alkali tablets, to change the concentration of the solution and the consequent diffusion rate. Similarly, an anhydrous feed solution may be employed in conjunction with an aqueous diffusate to influence the hydration of the solute, or vice versa, and the diffusion rate will thus be affected. In addition, the diffusion rate may be controlled by temperature. For example, some cooling towers are commonly operated only during the daylight hours and the diffusion of the chemical during non-operative hours when no blowdown or evaporation loss is experienced, is not desired. In such case, the form of the chemical selected may be one which is insoluble at the temperature experienced by the feeder in the cooling tower sump. An imersion heater connected to the electrical controls of the cooling tower is then placed in the feeder. Accordingly, when the cooling tower is placed in operation, the heater is activated to elevate the temperature within the feeder, form a solution of the chemical which is soluble at the temperature provided by the heater, and initiate the diffusion of the chemical to the cooling water.

While the preponderance of the specification has been devoted to a discussion of the practice of the invention in treating cooling water with chemicals which inhibit corrosion, it must be realized that the invention is suitable for use across a wide spectrum of related and dissimilar applications. For example, sodium sulfite is frequently employed in the treatment of boiler water for the purpose of scavenging dissolved oxygen which promotes corrosion. Similarly, precipitating agents such as sodium phosphate and chelating agents such as nitrilotriacetic acids are employed to remove potential scale forming calcium and magnesium impurities or hardness from the boiler water. The inventive technique may be employed to constantly and uniformly diffuse these chemicals to the boiler make-up water and/or condensate return. Furthermore, the invention may be employed in feeding chemicals such as biocides to paper and pulp mill systems. For example, 1,3-dichloro-5,5-dimethylhydantoin, sodium pentachlorophenate, 2 - mercaptobenzothiazole, copper sulfate pentahydrate, etc. may be diffused into paper and pulp mill systems by means of the inventive methods and apparatus. In such applications, the chemicals may be applied to the make-up water for the system if the concentrations of the mill systems are such as to impair diffusion, e.g. due to high concentrations of soluble fillers, etc., or directly to the white water in other situations. In addition, the inventive methods and apparatus may be employed to dispense soluble coagulants or coagulant aids such as alum, ferric sulfate, ferric chloride, etc. to waste water or the influent or effluent of water clarifiers.

The inventive methods and materials may also be used in the chlorination or similar treatment of public or private water supplies such as home wells and public or private swimming pools. The latter areas are particularly suitable for the practice of the invention. Specifically, the inventive feeders permit the proper chlorination or sanitization of swimming pools without maintenance, close supervision, or complex machinery. In such applications, the feeder employed is preferably provided with two diffusing membranes, one of which is provided with a cap closure. The other membrane constantly diffuses chlorine at the desired rate, which approximates the average demand of the pool to be treated, from a sodium hypochlorite solution contained by the feeder or from a solution of a chlorine donor compound such as 1,3-dichloro-5,5-dimethylhydantoin. The second membrane is kept closed until testing indicates that the chlorine level is inadequate and is then opened until the desired chlorine level is attained. Alternatively, a single membrane may be employed provided with orifice reducers 29 such as that shown by the drawing, but having apertures of varying areas, being employed to control the quantity of chlorine which is diffused into the water contained by the swimming pool.

The specification has also dealt predominantly with the water treatment industry and it is not denied that this area is particularly suitable for the practice of the invention. Specifically, the extremely low treatment levels, i.e. commonly in the range of 0.1 to less than a thousand parts of chemical per million parts of the liquid treated, favors a diffusion technique since the concentration gradient between suitable feed solutions and the level of the chemical desired and achieved in the liquid treated eliminates the possibility of fluctuations in the diffusion rate or the attainment of equilibrium in which diffusion is completely halted. Similarly, the limited quantity of feed solution required, in relation to the large volume of the liquid to be treated, permits a concentrated feed soution to be maintained without difficulty, expense or cumbersome apparatus. However, the invention is also applicable to both areas other than the water treatment industry, and to the treatment of liquids at higher treating levels. In the former regard, the invention may be employed to diffuse corrosion inhibitors and biocides to machine tool cooling circulating systems, catalysts to chemical reaction systems such as emulsion polymerization systems, additives such as spices and preservatives to food processes, dyes to food and textile processes, and fertilizers and herbicides to irrigation water. In the latter regard, in many cases the invention may be employed to add relatively large quantities of chemical to the liquids to be treated or small quantities of chemical to large volumes of the liquid to be treated, without the necessity for agitation or the use of dispersing or solubilizing aids. The latter benefits are possible in that the chemical is diffused from a true solution and arrives in the liquid to be treated in a condition which favors its immediate dissolution in the liquid without further assistance in the form of agitation, dispersing agents, etc. For example, the liquid to be treated may be flowed through a conduit or channel provided with a large diffusion membrane, or a plurality of smaller membranes, as an integral portion of the conduit or channel wall. In turn, the portion of the conduit or channel wall which contains the membrane or membranes serves as a common wall between the liquid to be treated and an external vat or receptacle containing a feed solution of the chemical with which the liquid is to be treated. By controlling the flow rate of the liquid through the conduit or channel, in relation to the diffusion rate of the available membrane surface area, the desired level of the chemical in the treated liquid may be obtained. For example, the intake or feed water for an industrial plant may be rendered less corrosive to the piping, receptacles, etc. through which the water is flowed or stored. A portion of the vertical sidewall of the intake pipe was cut out and a frame containing a plurality of semi-permeable membranes was substituted for the cut-out portion. A metal tank was positioned about the pipe in the area which included the frame and was sealed about the pipe so that a liquid could be maintained in the tank and so that the portion of the intake pipe containing the frame was immersed in the liquid contained by the tank. The tank was then filled with a concentrated solution of sodium dichromate. By selectively occluding the number of membranes within the frame which were available for diffusion, the quantity of chromate as $CrO_4$ which was added to the water in the intake pipe, was maintained at a constant 60 p.p.m. despite flow variations in the water passing through the intake pipe.

Similarly, the water intake pipe of a steel mill was plagued by the deposition of silt contained by the intake water. As a consequence, the bores of the water circulating pipes were reduced in diameter and the silt precipitated as crystalline scale upon heat transfer surfaces contacted by the water to impair heat transfer. It was found that 1 p.p.m. of a water soluble polyacrylamide having a molecular weight of 35,000 maintained the silt in a fluid, manageable condition and prevented its deposition as scale. Accordingly, a frame containing semipermeable membranes was placed in the wall of the water intake pipe and an aqueous solution of the polyacrylamide was maintained in contact with the membranes at the exterior of the intake pipe. Through adjustment of the diffusion rate of the membranes (by control of the surface area of the membranes available for diffusion, and the porosity of the membranes) in relation to the flow of the intake water, the polyacrylamide was diffused into the intake water and maintained therein at a level of 1 p.p.m.

In a coal washing operation, the above polyacrylamide was also employed to exert a flocculating effect upon the small particles yielded by the operation. An arrangement similar to that employed above in the treatment of the steel mill intake water was employed with the coal washing intake water to diffuse the polyacrylamide into the coal washing operation.

Similarly, a paper mill experienced high turbidity in its intake water and the contamination of its effluent by process by-products. The turbidity resulted in the fouling of its processes and equipment while the effluent yielded stream pollution if disposed of while in a contaminated state. As a consequence, the intake water was clarified by means of alum as a flocculant and a low molecular weight polyacrylamide as a coagulant aid. In addition, the effluent water was treated with ferric sulfate as a flocculant and a bentonitic clay as a weighting agent. Inventive feeders having a large capacity in terms of volume and diffusion rate were placed in the clarification pond and in the effluent or waste pond to diffuse the alum, ferric sulfate, bentonite and polyacrylamide from aqueous solutions of these materials.

An irrigation system employed ammonium nitrate as a fertilizer which was added to the crops in varying quantities. A portion of side wall of a lateral conduit through which the water was channeled to a field was cut out and replaced with a frame containing a plurality of semi-permeable membranes processing a total area of 1440 square inches. The membrane selected possessed a diffusion rate in relation to ammonium nitrate of 1 gram per square inch per hour at 70° F. Each of the membranes employed was provided with a sliding shutter-like closure which permitted the complete or partial curtailment of diffusion through the membrane. Since the flow through the lateral areas exceeded 20 gallons per hour, the membranes were capable of imparting over 2% by weight of the ammonium nitrate to the irrigation water, and lesser levels if a portion of the membranes were occluded or partially occluded by the closures.

Another irrigation canal measuring 15 miles in length and having a flow of 50 cubic feet per second was plagued by weeds. An inventive feeder having a capacity of 55 gallons and provided with a membrane capable of diffusing 20 grams of acrolein per hour was filled with a 10% aqueous solution of the acrolein and placed at the head of the canal. It was found that a level of as high as 10 p.p.m. of acrolein was maintained within the irrigation water and the weeds were killed and decomposed within a relatively short period. It should be noted that this inventive application provided an ancillary benefit. Specifically, concentrated acrolein presents an acute explosion hazard. However, the aqueous solutions employed were relatively hazard-free and permitted the application to be conducted in safety.

It is apparent that the invention provides new and improved methods for adding chemicals to liquids at a controlled rate without the necessity for moving parts, maintenance or the frequent replenishing of the supply of chemical.

We claim:

1. A method for continuously dispersing and maintaining a predetermined concentration of a chemical in a liquid which is subject to quantitative variations in the concentration of the chemical as a result of the dilution of the liquid, the consumption of the chemical and the flow of the liquid, comprising forming a solution containing a concentration of said chemical greater than said predetermined concentration, placing said solution in a liquid retaining receptacle and in contact with a membrane comprising at least a portion of the liquid retaining structure of said receptacle, said membrane being impermeable in respect to said solution and permeable in respect to said chemical in its dissolved state and having a diffusion rate adequate to diffuse a quantity of said chemical required to maintain said predetermined concentration and to compensate for reductions in the amount of said chemical in said liquid as the result of said quantitative variations, placing said member in contact with said liquid to provide a common barrier at the interface of said solution and said liquid, and allowing said chemical to diffuse through said membrane and into said liquid while maintaining a concentration of said chemical in said solution which is greater that the concentration of said chemical in said liquid, while providing for the discharge of any undesirable portion of the solvent portion of said liquid which passes through said membrane and into said liquid containing receptacle.

2. A method as claimed by claim 1 in which said solution is a saturated solution of said chemical.

3. A method as claimed by claim 1 in which said liquid is cooling water and said quantity is substantially equivalent to the amount of said chemical removed from the cooling system as the result of the blowing down of said cooling system.

4. A method as claimed by claim 1 in which said quantity is substantially equivalent to amounts of said chemical in said liquid which are consumed.

5. A method as claimed by claim 1 in which said liquid is in a state of dynamic flow and said quantity is substantially equivalent to the amount required to yield said predetermined concentration in return to the volume and rate of flow of said liquid.

6. A method as claimed by claim 1 in which said chemical is selected from the group consisting of water soluble zinc, phosphate and chromate salts and water soluble organic polymers.

7. A method as claimed by claim 1 in which said area is adjusted in proportion to changes in said predetermined concentration and said quantitative variations.

8. A method as claimed by claim 1 in which said membrane is a plurality of said membranes.

9. A system for continuously dispersing and maintaining a predetermined concentration of a chemical in a liquid which is subject to quantitative variations in the concentration of the chemical as the result of the dilution of the liquid, the consumption of the chemical and the flow of the liquid, comprising said liquid, a solution containing a concentration of said chemical which is greater than said predetermined concentration, a liquid retaining receptacle containing said solution in contact with a membrane which comprises at least a portion of the liquid retaining structure of said receptacle, and which provides a common barrier at the interface of said solution and said liquid, said membrane being inpermeable in respect to said solution and permeable in respect to said chemical in its dissolved state and having a diffusion rate adequate to diffuse into said liquid a quantity of said chemical required to provide said predetermined concentration and to compensate for reduction in the amount of said chemical in said liquid as the result of said quantitative variation, said receptacle further being provided with a means for discharging any undesirable portion of the solvent portion of said liquid which passes through said membrane and into said liquid retaining receptacle.

10. A system as claimed by claim 9 in which said chemical is selected from the group consisting of water soluble zinc, phosphate and chromate salts and water soluble organic polymers.

11. A system as claimed by claim 9 in which said liquid is cooling water and said quantity is substantially equivalent to the amount of said chemical removed from the cooling system as the result of the blowing down of said cooling system.

12. A system as claimed by claim 9 in which said solution is a saturated solution of said chemical.

13. A system as claimed by claim 12 in which the undissolved portion of said chemical contained by said saturated solution is deposited at the bottom of said receptacle and below the elevation of said membrane.

14. A system as claimed by claim 12 in which a foraminous protective shield is positioned adjacent to the surface of said membrane which is contacted by said liquid.

References Cited

UNITED STATES PATENTS 2,843,138  7/1958  Gilman _____ 210—59 X
3,223,620  12/1965  Oberhofer _____ 210—59 X

OTHER REFERENCES

Merrill, et al., The use of an artificial kidney. II. Clinical Experience, Journal of Clinical Investigation, vol. XXIX, No. 4, April 1950, pp. 425–438.

REUBEN FRIEDMAN, Primary Examiner

F. A. SPEAR, JR., Assistant Examiner

U.S. Cl. X.R.

210—60, 321